United States Patent
Viollet

(10) Patent No.: US 12,493,108 B2
(45) Date of Patent: Dec. 9, 2025

(54) USER INTERFACE WITH OPTICAL DETECTION DEVICE

(71) Applicants: UNIVERSITE D'AIX MARSEILLE, Marseilles (FR); CENTRE NATIONAL DE LA RECHERCHE SCIENTIFIQUE, Paris (FR)

(72) Inventor: Stéphane Viollet, Marseilles (FR)

(73) Assignees: UNIVERSITE D'AIX MARSEILLE, Marseilles (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 0 days.

(21) Appl. No.: 18/730,571

(22) PCT Filed: Jan. 20, 2023

(86) PCT No.: PCT/EP2023/051455
§ 371 (c)(1),
(2) Date: Jul. 19, 2024

(87) PCT Pub. No.: WO2023/139244
PCT Pub. Date: Jul. 27, 2023

(65) Prior Publication Data
US 2025/0138160 A1 May 1, 2025

(30) Foreign Application Priority Data
Jan. 21, 2022 (FR) ........................................ 2200516

(51) Int. Cl.
*G06F 3/03* (2006.01)
*G01S 7/481* (2006.01)
(52) U.S. Cl.
CPC .......... *G01S 7/4816* (2013.01); *G06F 3/0308* (2013.01)

(58) Field of Classification Search
CPC ...................................................... G06F 3/0308
USPC ........................................................... 345/156
See application file for complete search history.

(56) References Cited

U.S. PATENT DOCUMENTS

| | | | |
|---|---|---|---|
| 2006/0033015 A1* | 2/2006 | Feldmeier | G06F 1/3259 250/221 |
| 2016/0178735 A1 | 6/2016 | Shirasaka et al. | |
| 2024/0240941 A1* | 7/2024 | Loddo | G01S 17/48 |

FOREIGN PATENT DOCUMENTS

| | | |
|---|---|---|
| DE | 19962701 A1 | 6/2001 |
| FR | 2647897 A1 | 12/1990 |

OTHER PUBLICATIONS

International Search Report for International Application No. PCT/EP2023/051455, mailed Mar. 28, 2023, 5 pages with English translation.

(Continued)

*Primary Examiner* — Calvin C Ma
(74) *Attorney, Agent, or Firm* — TraskBritt

(57) ABSTRACT

A user interface, which includes a device for optically detecting the presence and position of an object in a detection zone, includes a lighting means for illuminating the detection zone. A linear detection strip is oriented toward the detection zone. The linear detection strip includes a row of photosensors that are configured to measure the light intensity of the light emitted by the lighting means. The sensitivity to light of each photosensor is weighted depending on the position of the photosensor along the row of photosensors.

18 Claims, 4 Drawing Sheets

(56) References Cited

OTHER PUBLICATIONS

International Written Opinion for International Application No. PCT/EP2023/051455, mailed Mar. 28, 2023, 10 pages with English machine translation.

* cited by examiner

USER INTERFACE WITH OPTICAL DETECTION DEVICE

CROSS-REFERENCE TO RELATED APPLICATIONS

This application is a national phase entry under 35 U.S.C. § 371 of International Patent Application PCT/EP2023/051455, filed Jan. 20, 2023, designating the United States of America and published as International Patent Publication WO 2023/139244 A1 on Jul. 27, 2023, which claims the benefit, under Article 8 of the Patent Cooperation Treaty, of French Patent Application Serial No. FR2200516, filed Jan. 21, 2022.

TECHNICAL FIELD

The disclosure relates to the field of interfaces, in particular to allowing a user to interact with a machine. The disclosure more particularly relates to devices making it possible to detect instructions or indications expressed by a user physically.

BACKGROUND

Many interfaces allow a user to interact with a machine such as a computer. Among the commonest, keyboards allow text to be entered by pressing physical keys. Likewise, mice allow the movement of a pointer on a screen to be controlled through physical movement of the mouse.

User interfaces are undergoing substantial development, in particular to keep pace with the evolution of computer hardware and software. One of the axes of this development is detection of a user's indications through direct interpretation of her or his movements, no physical element being manipulated thereby.

BRIEF SUMMARY

The aim of embodiments of the disclosure is to improve the user interfaces of the prior art.

To this end, embodiments of the disclosure relate to a user interface comprising a device enabling optical detection of the presence and position of an object in a detection zone, this interface comprising:
- a means for illuminating the detection zone; and
- a linear detection strip, oriented toward the detection zone, and comprising a row of photosensors configured to measure the light intensity of the light emitted by the lighting means, the sensitivity to light of each photosensor being weighted depending on the position of the photosensor along the row of photosensors.

The user interface, according to embodiments of the disclosure, makes it possible to detect the presence and position of an object such as a finger of the user, her or his hand, or another part of her or his body, without requiring any camera or touch-activated or physical device. Position is detected in an absolute manner, and with great precision.

The device, according to embodiments of the disclosure, may be used in any environment, while minimizing the physical equipment required, and in a way that is more intuitive to the user.

Position is detected contactlessly, in a way that is insensitive to electromagnetic interference, and without generating electromagnetic interference. Optical detection has the advantages expected in the context of optical position-detecting technologies: reliability, simplicity, electromagnetic compatibility.

The device enabling optical detection, according to embodiments of the disclosure, may have the following additional features, alone or in combination:
- the sensitivity to light of each photosensor is weighted such that the sensitivity to light of the photosensors increases with the ordinal position of the photosensors along the row of photosensors;
- the sensitivity to light of each photosensor is weighted by applying a weighting coefficient to the output signal of each photosensor;
- the photosensors each have a sensitivity cone defining the angles at which the photosensor is able to sense light radiation, the photosensors having overlapping sensitivity cones;
- the degree of overlap of the sensitivity cones of the photosensors is at least 15%;
- the interface is configured to determine the position of the object based on the sum of the weighted values of the output signals of each photosensor;
- the sensitivity to light of the photosensors is weighted according to at least two weightings in parallel: a first weighting considering all the photosensors, and a second weighting considering only some of the photosensors;
- according to the second weighting, the sensitivity to light of each photosensor, that is considered according to the second weighting, is weighted such that the sensitivity to light of the photosensors increases with the ordinal position of the photosensors along the row of photosensors;
- the sensitivity to light of each photosensor is weighted, according to the second weighting, by applying a weighting coefficient to the output signal of each photosensor;
- the interface is configured to determine the position of the object based on the sum of the weighted values of the output signals of each photosensor, according to the first weighting or the second weighting, depending on the distance between the object and the linear detection strip. In other words, the interface is thus configured to determine the position of the object based on the sum of the weighted values of the output signals of each photosensor: according to the first weighting when the distance between the object and the linear detection strip is less than a predetermined value; and according to the second weighting when the distance between the object and the linear detection strip is greater than a predetermined value;
- the sum of the weighted values is divided by a mean of the sum of the weighted values according to the first weighting and of the sum of the weighted values according to the second weighting;
- the interface comprises an additional distance sensor configured to determine the distance between the object and the linear detection strip;
- the photosensors are regularly distributed along the row of photosensors with a pitch p, the second weighting considering only the photosensors with a pitch $2p$;
- the interface comprises a control module that comprises a first computing element configured to compute the sum of the light-intensity values detected by the photosensors, while applying a weighting coefficient to each thereof;

the control module comprises a second computing element configured to compute the sum of the light-intensity values detected by the photosensors considered according to the second weighting, while applying a weighting coefficient to each thereof;

the lighting means comprises a plurality of light emitters inserted regularly between the photosensors and oriented toward the detection zone;

the light emitters each have an emission cone defining the angles at which the light emitter emits light radiation, the light emitters having overlapping emission cones; and/or the lighting means is configured to flicker at a frequency, and the output signals of each photosensor are demodulated at the same frequency.

BRIEF DESCRIPTION OF THE DRAWINGS

Other features and advantages of embodiments of the disclosure will become apparent from the non-limiting description that follows, with reference to the accompanying drawings, in which.

Similar elements common to various embodiments have been designated by the same reference numerals in all the figures.

DETAILED DESCRIPTION

Figure 1:
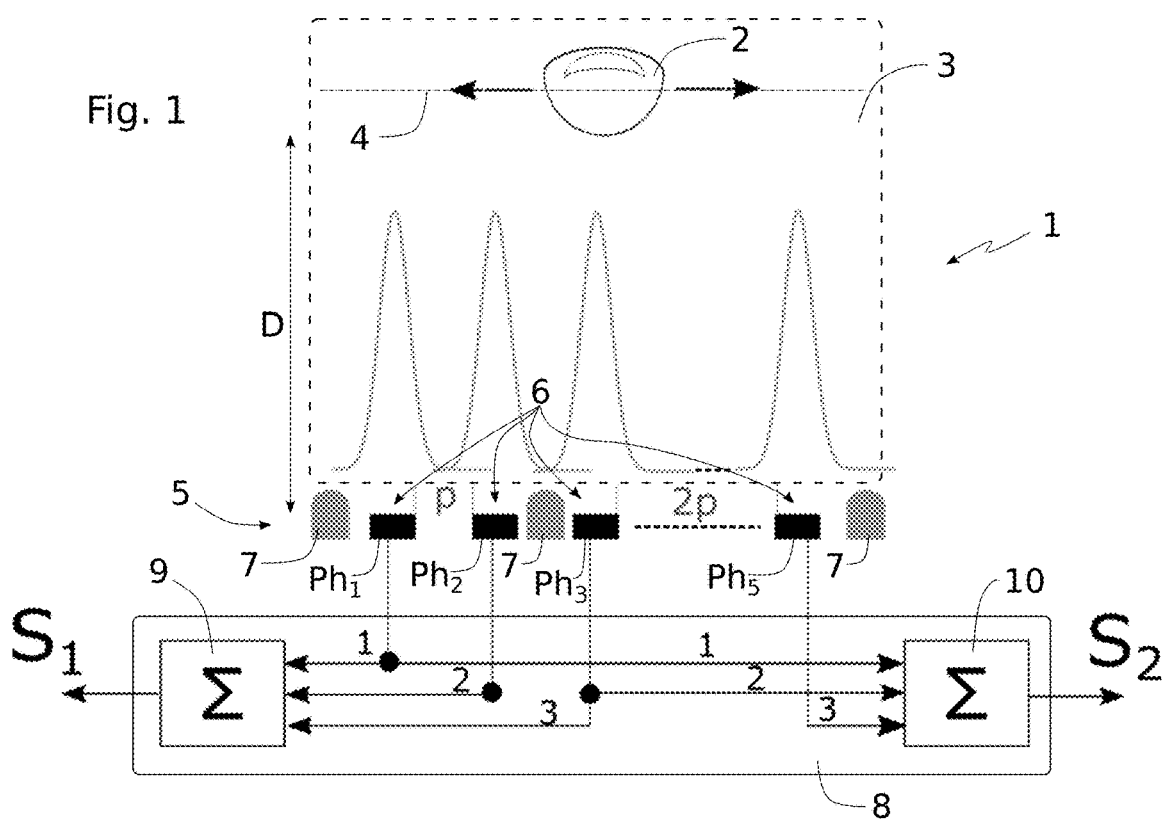
FIG. 1 is a schematic illustration of a device enabling optical detection according to embodiments of the disclosure.

FIG. 1 schematically illustrates a device 1 enabling optical detection according to embodiments of the disclosure. In this example, this device forms part of an interface that allows a user to transmit commands to a piece of computer equipment by presenting her or his finger 2 in one or more given positions in a detection zone 3. The detection zone 3 may, for example, be a virtual keyboard or a virtual console, optionally embodied by a visible element in two or three dimensions.

In FIG. 1, the finger 2 of the user has been schematically shown from in front and the device 1 is capable of locating the position of this finger along a detection axis 4 that extends as indicated by the double-headed arrow shown in FIG. 1. Detection of the finger 2 at a given abscissa along the detection axis 4 corresponds to an instruction given by the user to the machine.

The device 1 comprises a linear detection strip 5 that comprises photosensors 6 that are aligned along the detection axis 4, and that, therefore, form a row of photosensors 6. The distance between the linear detection strip 5 and the finger 2 is denoted D.

The photosensors are generally designated by the reference number 6 in the figures, and are individually numbered $Ph_1$, $Ph_2$, $Ph_3$, ..., $Ph_5$ in FIG. 1. The photosensors may be of any known type, such as photodiodes, photoresistors, etc., and have a Gaussian angular sensitivity to light. In FIG. 1, the Gaussian sensitivity curve has been illustrated above each photosensor 6.

The linear detection strip 5 is oriented toward the detection zone 3; i.e., the photosensors 6 are turned toward the detection zone 3.

The device 1 in addition comprises a means 7 for illuminating the detection zone 3, which means 7 is also referred to herein as a "lighting means 7." One advantageous example consists in forming the lighting means 7 with light emitters (for example, light-emitting diodes) inserted regularly between the photosensors 6, and oriented toward the detection zone 3. These light emitters each have an emission cone defining the angles at which the light emitter emits light radiation. Preferably, these emission cones overlap. In this example, a light emitter is inserted every two photosensors 6, in the row of photosensors 6.

In the linear detection strip 5, the photosensors 6 are regularly distributed with a constant spacing corresponding to a pitch denoted p in FIG. 1.

Along the row of photosensors 6, the value of the sensitivity to light of each photosensor 6 is weighted depending on the position of the photosensor along the row. This weighting is here achieved by forming a row of photosensors 6 from photosensors the sensitivity to light of which increases along the row of photosensors 6. The sensitivity to light of each photosensor 6 is thus weighted such that the sensitivity to light of the photosensors 6 increases with the ordinal position of the photosensors 6 along the row of photosensors 6. In other words: the second photosensor 6 (along the row of photosensors 6) has a sensitivity to light greater than that of the first photosensor 6; the third photosensor 6 has a sensitivity to light greater than that of the second photosensor 6; the fourth photosensor 6 has a sensitivity to light greater than that of the third photosensor 6; and so on.

In this example, each photosensor 6 is assigned a weighting coefficient, by which the value of the sensitivity to the light that it measures is multiplied, this coefficient corresponding to the ordinal position of the photosensor along the line.

The device 1 comprises a control module 8 formed by any suitable analog or digital electronic means, such as a microcontroller.

The control module 8 comprises a first computing element 9 configured to compute the sum of the light-intensity values detected by the photosensors, while applying to each thereof a weighting coefficient that is equal to the ordinal position of the photosensor in the row of photosensors.

In FIG. 1, the first computing element 9:

receives the light intensity of the first photosensor $Ph_1$ and applies thereto the weighting coefficient 1;

receives the light intensity of the second photosensor $Ph_2$ and applies thereto the weighting coefficient 2; and receives the light intensity of the third photosensor $Ph_3$ and applies thereto the weighting coefficient 3.

In the schematic illustration of FIG. 1, only three photosensors 6 feed the first computing element 9, it being understood that the linear detection strip may however comprise as many photosensors 6 as required to cover a detection axis 4 of a desired length.

The weighted sum $S_1$ of the output values of the photosensors 6 is defined in the following way:

$$S_1 = \sum_{i=1}^{n} i * Ph_i$$

with i=1, 2, 3, ..., n being the number of photosensors 6, and $Ph_i$ the output signal corresponding to photosensor $ph_i$.

In the present example, the control module 8 also carries out a second weighting in parallel with the first, which may optionally improve the measurement. In addition to the weighting described above, the control module 8 is configured to weight the outputs of the photosensors 6 that are separated by a distance 2*p* (which may also be referred to herein as a "pitch 2*p*"). The control module 8 thus comprises a second computing element 10 configured to compute the sum of the light-intensity values detected by the photosensors 6 concerned by this second weighting, i.e., one photosensor 6 in two with respect to the first weighting, while applying to each of these photosensors 6 a weighting depending on the ordinal position of each thereof. Thus, according to this second weighting, only photosensors 6 spaced apart by the pitch 2*p* are considered to form a row of photosensors 6, and the light intensity measured by each is multiplied by a coefficient corresponding to the ordinal position of each thereof in this row of photosensors 6.

In FIG. 1, the second computing element 10:
receives the light intensity of the first photosensor $Ph_1$ and applies thereto the weighting coefficient 1;
receives the light intensity of the third photosensor $Ph_3$ and applies thereto the weighting coefficient 2; and
receives the light intensity of a fifth photosensor $Ph_5$ and applies thereto the weighting coefficient 3.

The weighted sum $S_2$ of the output values of the only photosensors 6 considered by the second weighting is defined in the following way:

$$S_2 = \sum_{i=1}^{n} i * Ph_{2i}$$

with i=1, 2, 3, . . . , n being the total number of photosensors (in this new considered row of photosensors), and $Ph_{2i}$ the output signal of the photosensor 6 separated by pitch 2*p* from its neighbor.

When the user positions her or his finger 2 at a precise location in the detection zone 3, the finger 2 is illuminated by the lighting means 7. The finger 2 then has a luminosity greater than the ambient luminosity. The presence of this object thus illuminated furnishes each of the photosensors 6 with a light intensity that decreases with the distance between the photosensor 6 and the finger 2.

The photosensors 6 have a sensitivity cone defining the angles at which the photosensor 6 is able to sense light radiation. The photosensors 6 are chosen and positioned so that their sensitivity cones overlap. The photosensors 6 preferably have a degree of overlap between these sensitivity cones of 15% or more.

Figure 2:
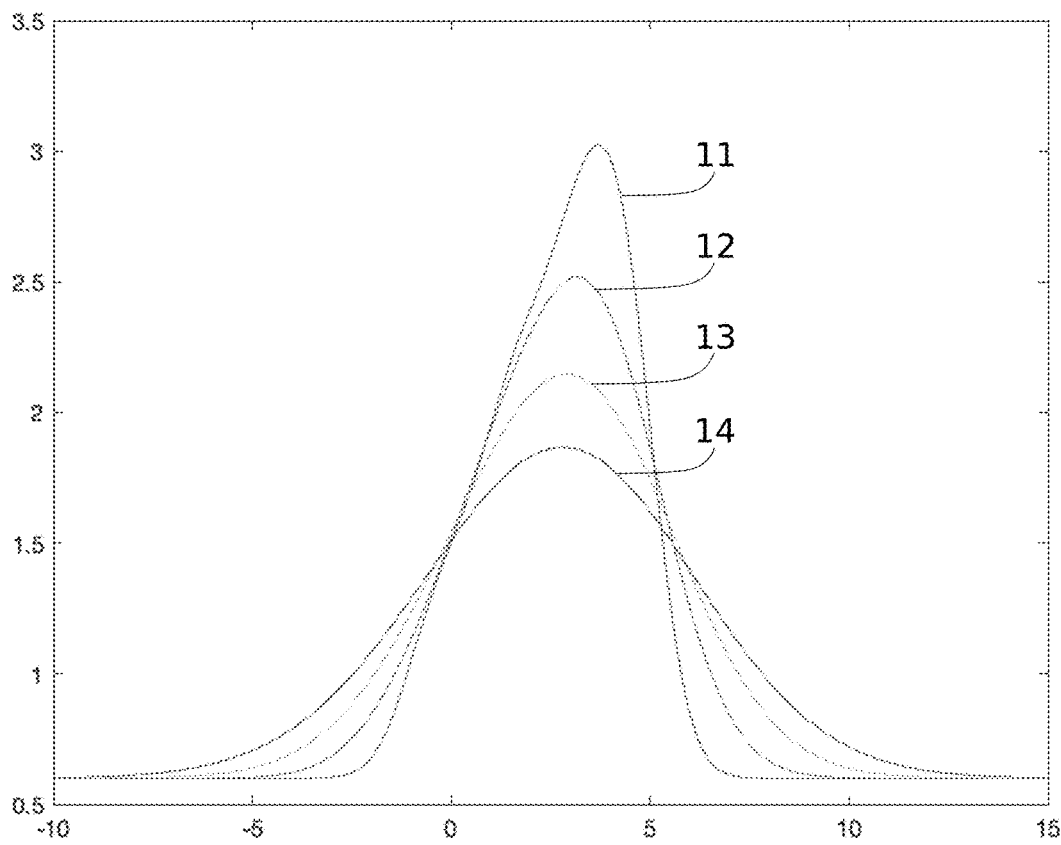
FIG. 2, FIG. 3, FIG. 4, FIG. 5, and FIG. 6 are graphs illustrating signal processing allowing the optical detection.

FIG. 2 illustrates the weighted sum $S_1$ as a function of the linear position of the finger 2 along the detection axis 4, in centimeters about a position 0. FIG. 2 shows four curves corresponding to four different distances:
a curve 11 representing the weighted sum $S_1$ for a distance D between the finger 2 and the linear detection strip 5 of 5 cm;
a curve 12 representing the weighted sum $S_1$ for a distance D of 10 cm;
a curve 13 representing the weighted sum $S_1$ for a distance D of 15 cm; and
a curve 14 representing the weighted sum $S_1$ for a distance D of 20 cm.

In this example, the pitch p is 2 cm, the angular width (full width at half maximum) of each Gaussian (characteristic of the sensitivity cone of the photosensors 6) is 20°, and the width of the finger 2 is 2 cm.

FIG. 2 shows that the finger 2 may be located linearly with great precision over a range extending from almost −5 cm to almost +5 cm. Specifically, over this range, the curve of the position of the finger 2 as a function of the weighted sum $S_1$ output by the first computing element 9 is very close to a straight line. In other words, the control module 8 is able to directly determine the position of the finger 2 on the detection axis 4 from a simple digital value to be converted by a linear application (slope of the corresponding straight line). This conversion is fast and requires very few computational resources, in particular far fewer than processing of images collected by camera. This simple operation nevertheless allows the finger 2 to be positioned very precisely.

Figure 3:
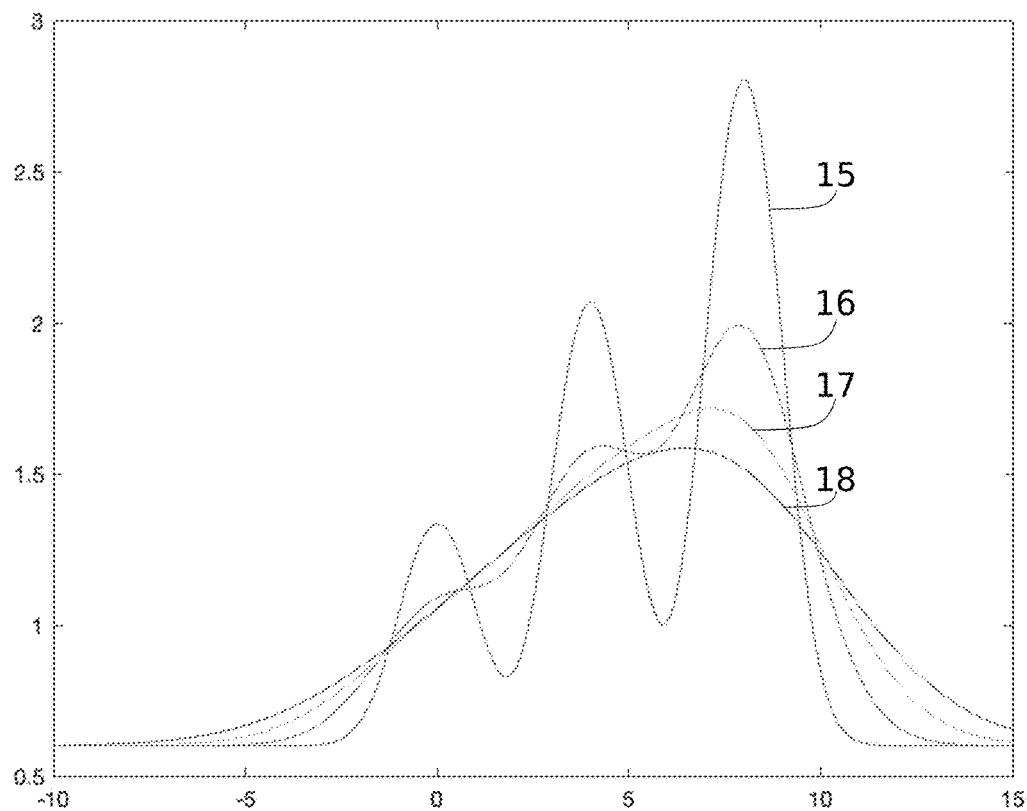

FIG. 3 is a graph similar to that of FIG. 2, but relative to the weighted sum $S_2$. FIG. 3 thus illustrates the weighted sum $S_2$ as a function of the linear position of the finger 2 along the detection axis 4, in centimeters about a position 0. FIG. 3 shows four curves corresponding to the same four distances of FIG. 2:
a curve 15 representing the weighted sum $S_2$ for a distance D of 5 cm;
a curve 16 representing the weighted sum $S_2$ for a distance D of 10 cm;
a curve 17 representing the weighted sum $S_2$ for a distance D of 15 cm; and
a curve 18 representing the weighted sum $S_2$ for a distance D of 20 cm.

FIG. 3 shows that the finger 2 may be located linearly with great precision over a wider range than possible with the weighted sum $S_1$, but only for the distances corresponding to curves 17 and 18. In addition, for these curves 17, 18, the gain is almost constant as a function of the distance D, this making it possible to obtain a correspondence, between the weighted sum $S_2$ output by the second computing element 10 and the linear position of the finger on the detection axis 4, that is given by a single straight line, whatever the distance between the finger 2 and the linear detection strip 5.

In contrast, in the case of distances less than 15 cm (curves 15 and 16), the measurement becomes less and less linear, with the appearance of undulations preventing a bijective correspondence from being obtained between the weighted sum and the position of the finger.

Figure 4:
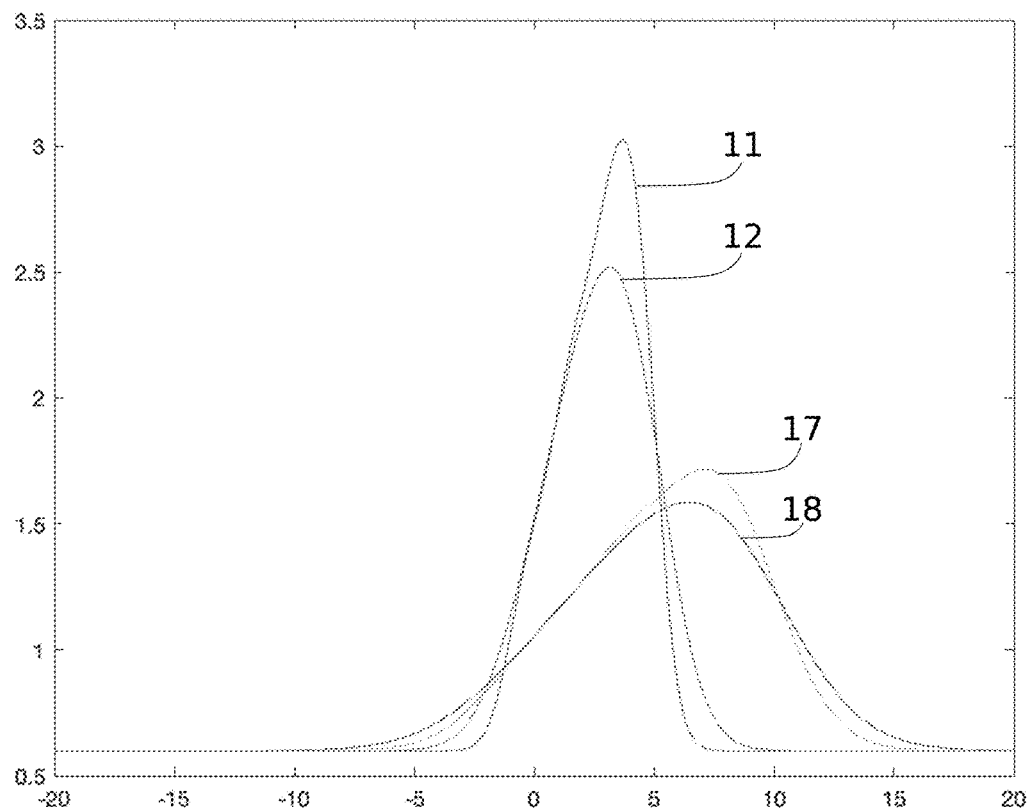

The weighted sum $S_2$ may thus, as a variant, be used to complete the correspondence given by the weighted sum $S_1$, to improve the measurement range and to deliver a constant-gain measurement, for distances D over which the weighted sum $S_2$ is exploitable. FIG. 4 illustrates this combination in which the control module 8 selects the weighted sum $S_1$ or the weighted sum $S_2$, depending on the distance D between the finger 2 and the linear detection strip 5. The weighted sum $S_2$ is used for distances D from 10 cm to 20 cm, and the weighted sum $S_1$ continues to be used for distances D up to 10 cm.

The interface is thus configured to determine the position of the object (finger 2) based on the sum of the weighted values of the output signals of each photosensor 6:
according to the first weighting when the distance between the object (finger 2) and the linear detection strip 5 is less than a predetermined value; and
according to the second weighting when the distance between the object (finger 2) and the linear detection strip 5 is greater than a predetermined value.

Optionally, a corrective gain may be applied to obtain a substantially identical slope for each range.

To implement this solution combining the weighted sums $S_1$ and $S_2$, additional distance sensors of the time-of-flight (ToF) type or of the rangefinder type may, for example, be used to obtain the distance D.

The sensitivity to light of the photosensors 6 of the row of photosensors 6 is thus weighted according to at least two weightings in parallel: a first weighting considering all the photosensors (with the pitch p), and a second weighting considering only some of the photosensors 6 (here photosensors 6 with a pitch 2p).

In the present example, the weighted sum $S_2$ is relative to a pitch 2p; i.e., it considers only one photosensor 6 in two. However, as a variant, the weighted sum $S_2$ may be computed for a different choice of pitch: it may, for example, consider one photosensor 6 in three (corresponding to a pitch 3p), or one photosensor 6 in four (corresponding to a pitch 4p), depending on the distance to be allowed for the finger 2.

Figure 5:
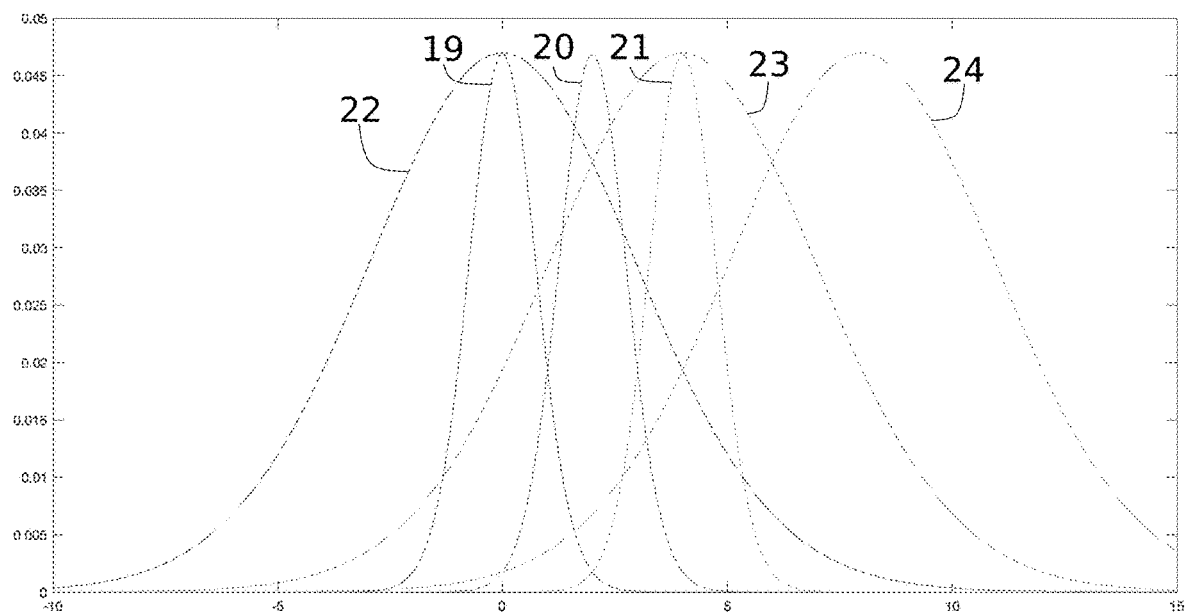

FIG. 5 also relates to the combination of FIG. 4. FIG. 5 illustrates the projected Gaussian curves as a function of the distance D and of the position of the finger (Gaussian curves in this example, with a full width at half maximum of) 20°.

As regards the weighted sum $S_1$, the three curves 19, 20, 21 illustrate, for a distance D of 5 cm, the Gaussian curves of three photosensors 6 positioned at 0, 2 and 4 cm, respectively.

As regards the weighted sum $S_2$, the three curves 22, 23, 24 illustrate, for a distance D of 20 cm, the Gaussian curves of three photosensors 6 positioned at 0, 4 and 8 cm, respectively.

FIG. 5 shows the advantage of selecting either the distribution of curves 19, 20, 21 or of curves 22, 23, 24, depending on the distance D, i.e., because it makes it possible to maintain a sufficient Gaussian overlap to ensure that the finger is located with good linearity.

Moreover, to obviate the effect of environmental disturbances, it is possible to make the photosensors 6 and the light emitted by the lighting means 7 correspond. For example, it is possible to make the lighting means 7 flicker at a certain frequency and to use this modulation signal to demodulate, via synchronous detection, the output signals of each photosensor 6. Thus, it is possible to obviate the effect of variations in ambient lighting due, for example, to the sun or artificial lighting. A selective filter (rejector) may also be added to reject lighting disturbances due to flickering ambient lighting (e.g., fluorescent tubes at 100 Hz, or some LED lighting).

As a variant, in addition to the weighted sum $S_2$, other additional weighted sums considering a selection of photosensors with a pitch other than p and 2p may be used to complete the weighted sum $S_1$.

Also as a variant, in addition to the weighted sums $S_1$ and $S_2$, it is possible to compute a mean sum $S_{moy}$ and to divide $S_1$ by $S_{moy}$ and $S_2$ by $S_{moy}$, this amounting to normalizing the sums.

In this case, the weighted sums $S_1$ and $S_2$ thus normalized would be written:

$$S_1 = \frac{\sum_{i=1}^{n} i * Ph_j}{\frac{\sum_{i=1}^{n} Ph_i}{n}} \text{ and } S_2 = \frac{\sum_{i=1}^{n} i * Ph_{2i}}{\frac{\sum_{i=1}^{n} Ph_i}{n}}$$

Figure 6:
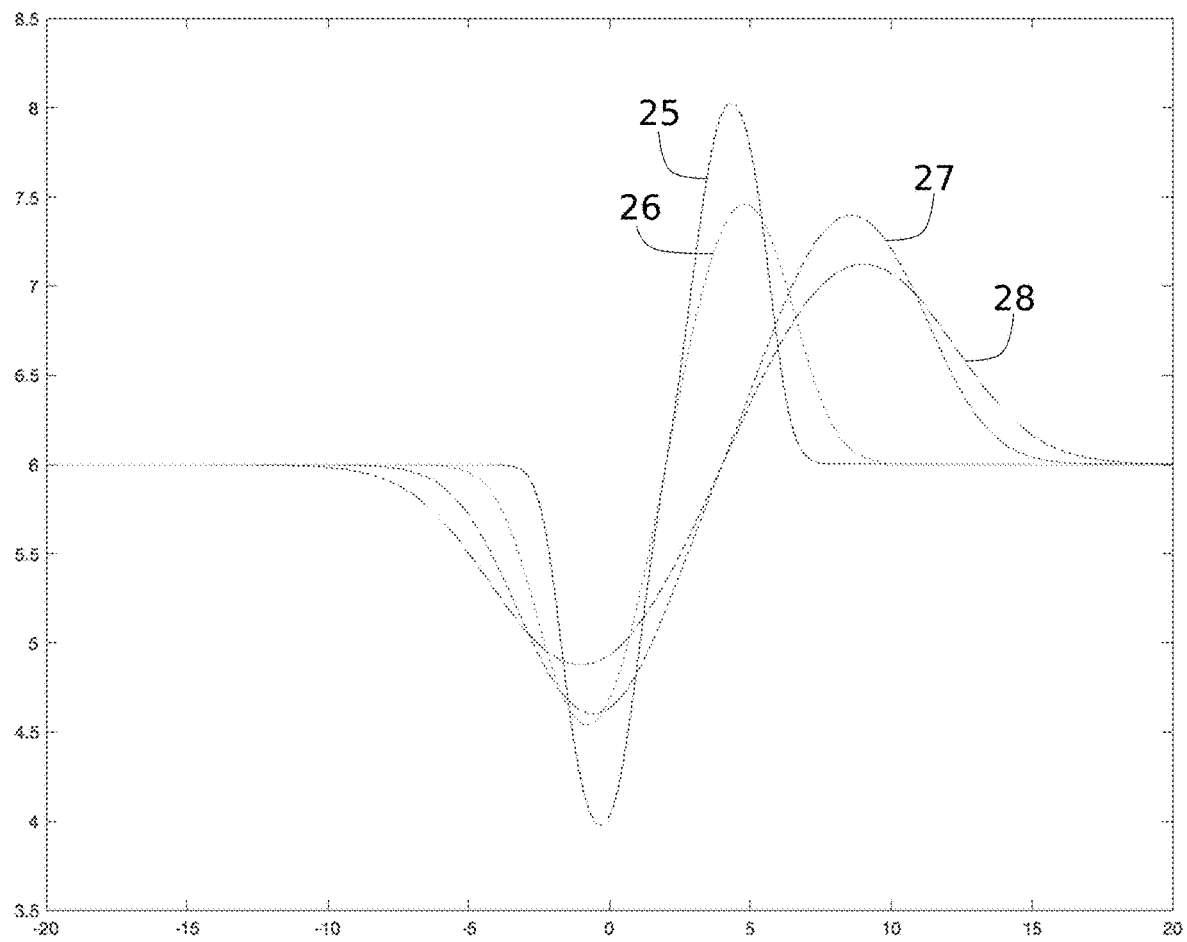

FIG. 6 shows the forms of the sums $S_1$ and $S_2$ normalized in this way:

a curve 25 represents the weighted sum $S_1$ thus normalized, for a distance D of 5 cm;

a curve 26 represents the weighted sum $S_1$ thus normalized, for a distance D of 10 cm;

a curve 27 represents the weighted sum $S_2$ thus normalized, for a distance D of 15 cm; and a curve 28 represents the weighted sum $S_2$ thus normalized, for a distance D of 20 cm.

An odd curve advantageous for location purposes, with a limited variation in slope, is obtained. The normalized sum $S_2$ is here selected for distances of 15 and 20 cm, and the normalized sum $S_1$ for distances of 5 and 10 cm.

Figure 7:
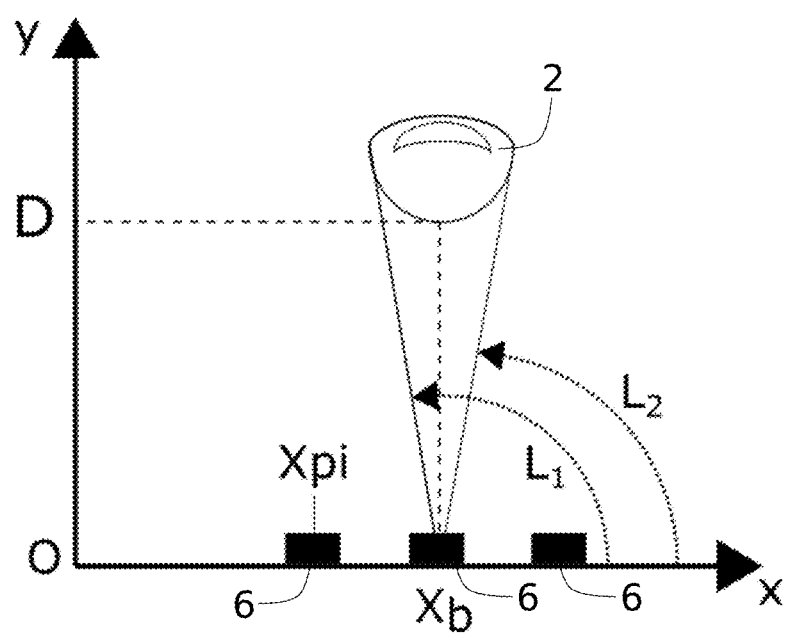
FIG. 7 is an illustrative view of the parameters involved in the optical detection.

One example of a model used to define the position of the finger 2 will now be presented, with reference to FIG. 7.

The finger 2 is considered to be a contrasted strip of intensity $I_1$ placed on a background of intensity $I_2$. The width of the strip is denoted $\Delta_f$. The finger 2 is at a distance D from the linear detection strip 5, and its abscissa on the detection axis 4 is $X_b$. The abscissa of the photosensors 6 (their position along the detection axis 4) is denoted Xpi. $L_1$ and $L_2$ are the detection angles of the edges of the finger 2.

The equation for the Gaussian angular sensitivity s (Y) is written:

$$s(\Psi) = \frac{2\sqrt{\pi \ln(2)}}{\pi \Delta \rho} e^{-4\ln(2)\frac{\Psi^2}{\Delta \rho^2}}$$

with $\Delta_\rho$ the full width at half maximum of the Gaussian curve.

It is then necessary to integrate over the entire angular width of the Gaussian (from minus infinity to plus infinity) to compute the total intensity of the signal received by the photosensor placed under the finger:

$$Ph(\Psi_c) = I_2 \int_{-\infty}^{\Psi_c - \frac{L_1}{2}} s(\Psi) d\Psi + I_1 \int_{\Psi_c - \frac{L_1}{2}}^{\Psi_c + \frac{L_2}{2}} s(\Psi) d\Psi + I_2 \int_{\Psi_c + \frac{L_2}{2}}^{+\infty} s(\Psi) d\Psi$$

with $$\Psi_c = \arctan 2\left(\frac{D}{X_b - X_p}\right)$$

and with $X_p$ the abscissa of the photosensor in question.

This gives:

$$Ph(\Psi_c) = \frac{I_1 - I_2}{2}\left(\text{erf}\left(\frac{2\sqrt{\ln(2)}}{\Delta \rho} * L_1\right) - \text{erf}\left(\frac{2\sqrt{\ln(2)}}{\Delta \rho} * L_2\right)\right) + I_2$$

with erf: the error function (integral of a Gaussian); and the angles $L_1$ and $L_2$ defined as follows:

$$L_2 = \arctan 2\left(\frac{D}{X_b - X_p + 0.5\Delta_f}\right)$$

and $$L_1 = \arctan 2\left(\frac{D}{X_b - X_p - 0.5\Delta_f}\right)$$

Variants of embodiments of the device may be implemented. For example, the lighting means 7 and the associated photosensors 6 may work at any suitable (visible or invisible) wavelength and, in particular, in the infrared.

The example given here relates to detection of the position of a finger 2, but a hand, foot or another part of the body or an object held by the user may be detected.

Moreover, the linear detection strip 5 presented by way of example is rectilinear, but it will be understood that the strip, and therefore the row of photosensors 6 and the detection axis 4, may also be curved and, in particular, semicircular.

In addition, a plurality of linear detection strips 5 may be combined to detect the position of the object along various detection axes. For example, multiple linear detection strips 5 arranged along different axes would allow the finger 2 to be detected in a space of a plurality of dimensions.

The invention claimed is:

1. A user interface comprising a device enabling optical detection of a presence and position of an object in a detection zone, the user interface comprising:
    a lighting means for illuminating the detection zone; and
    a linear detection strip, oriented toward the detection zone and comprising a row of photosensors configured to measure light intensity of light emitted by the lighting means, a sensitivity to light of each photosensor being weighted depending on a position of the photosensor along the row of photosensors.

2. The user interface of claim 1, wherein the sensitivity to light of each photosensor is weighted such that the sensitivity to light of the photosensors increases with ordinal position of the photosensors along the row of photosensors.

3. The user interface of claim 1, wherein the sensitivity to light of each photosensor is weighted by applying a weighting coefficient to an output signal of each photosensor.

4. The user interface of claim 1, wherein the photosensors each have a sensitivity cone defining angles at which the photosensor is able to sense light radiation, the photosensors having overlapping sensitivity cones.

5. The user interface of claim 4, wherein a degree of overlap of the sensitivity cones of the photosensors is at least 15%.

6. The user interface of claim 1, wherein the user interface is configured to determine the position of the object based on a sum of weighted values of output signals of each photosensor.

7. The user interface of claim 1, wherein the sensitivity to light of the photosensors is weighted according to at least two weightings in parallel: a first weighting considering all the photosensors, and a second weighting considering only some of the photosensors.

8. The user interface of claim 7, wherein, according to the second weighting, the sensitivity to light of each photosensor that is considered according to the second weighting, is weighted such that the sensitivity to light of the photosensors increases with ordinal position of the photosensors along the row of photosensors.

9. The user interface of claim 7, wherein the sensitivity to light of each photosensor is weighted, according to the second weighting, by applying a weighting coefficient to an output signal of each photosensor.

10. The user interface of claim 7, wherein the user interface is configured to determine the position of the object based on a sum of weighted values of output signals of each photosensor, according to the first weighting or the second weighting, depending on a distance between the object and the linear detection strip.

11. The user interface of claim 10, wherein the sum of the weighted values is divided by a mean of the sum of the weighted values according to the first weighting and of the sum of the weighted values according to the second weighting.

12. The user interface of claim 10, further comprising an additional distance sensor configured to determine the distance between the object and the linear detection strip.

13. The user interface of claim 7, wherein the photosensors are regularly distributed along the row of photosensors with a pitch p, the second weighting considering only the photosensors with a pitch 2$p$.

14. The user interface of claim 1, further comprising a control module that comprises a first computing element configured to compute a sum of light-intensity values detected by the photosensors, while applying a weighting coefficient to each thereof.

15. The user interface of claim 14, wherein:
    the sensitivity to light of the photosensors is weighted according to at least two weightings in parallel: a first weighting considering all the photosensors, and a second weighting considering only some of the photosensors; and
    the control module further comprises a second computing element configured to compute a sum of the light-intensity values detected by the photosensors considered according to the second weighting, while applying a weighting coefficient to each thereof.

16. The user interface of claim 1, wherein the lighting means comprises a plurality of light emitters inserted regularly between the photosensors and oriented toward the detection zone.

17. The user interface of claim 16, wherein the light emitters each have an emission cone defining angles at which the light emitter emits light radiation, the light emitters having overlapping emission cones.

18. The user interface of claim 1, wherein the lighting means is configured to flicker at a frequency, and output signals of each photosensor are demodulated at a same frequency.

* * * * *